Jan. 12, 1943.                F. L. WILLRODT                2,307,732
                                TRACTOR GUIDE
                         Filed Sept. 15, 1941        2 Sheets-Sheet 1
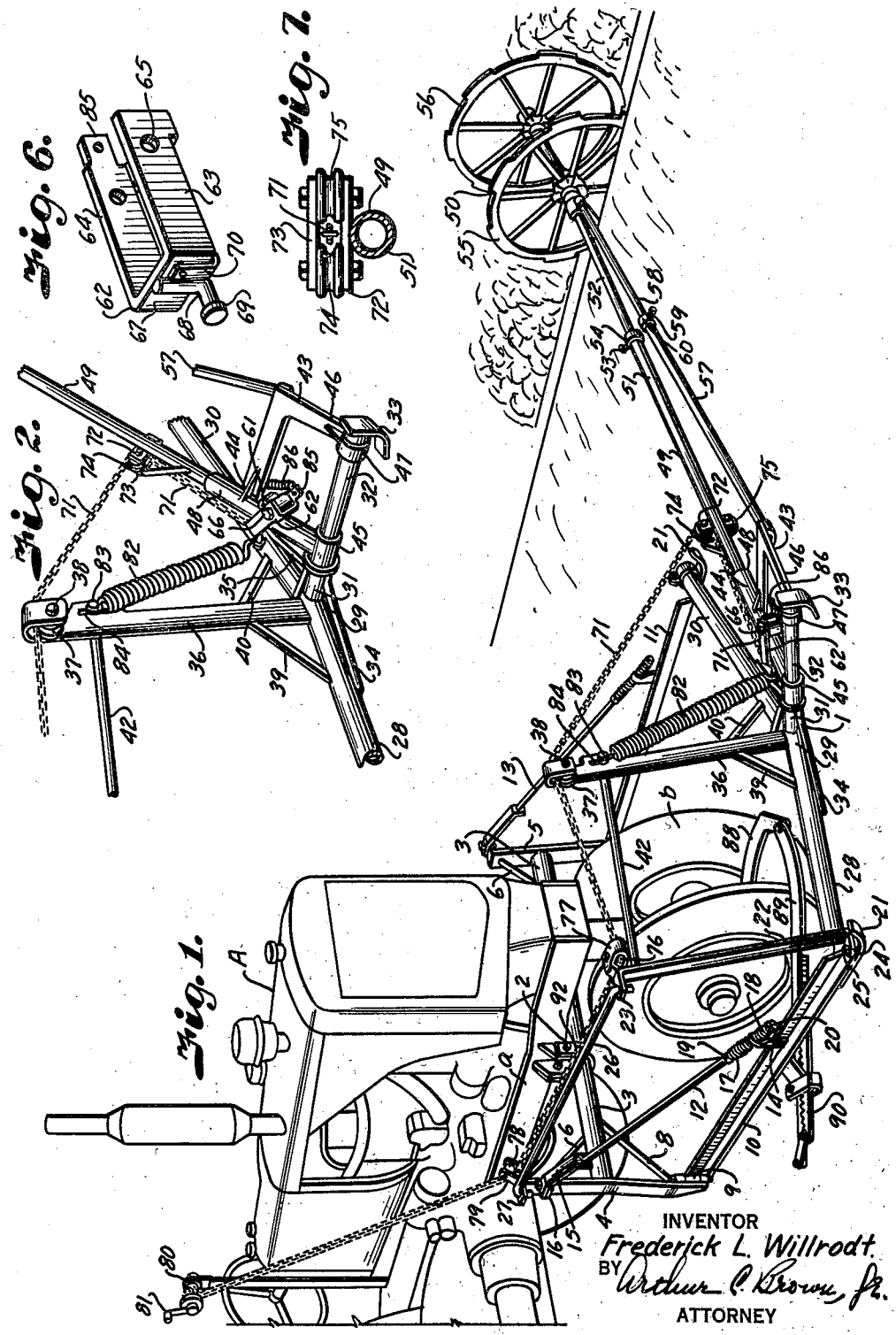
INVENTOR
Frederick L. Willrodt
BY
ATTORNEY Jan. 12, 1943.  F. L. WILLRODT  2,307,732
TRACTOR GUIDE
Filed Sept. 15, 1941  2 Sheets-Sheet 2
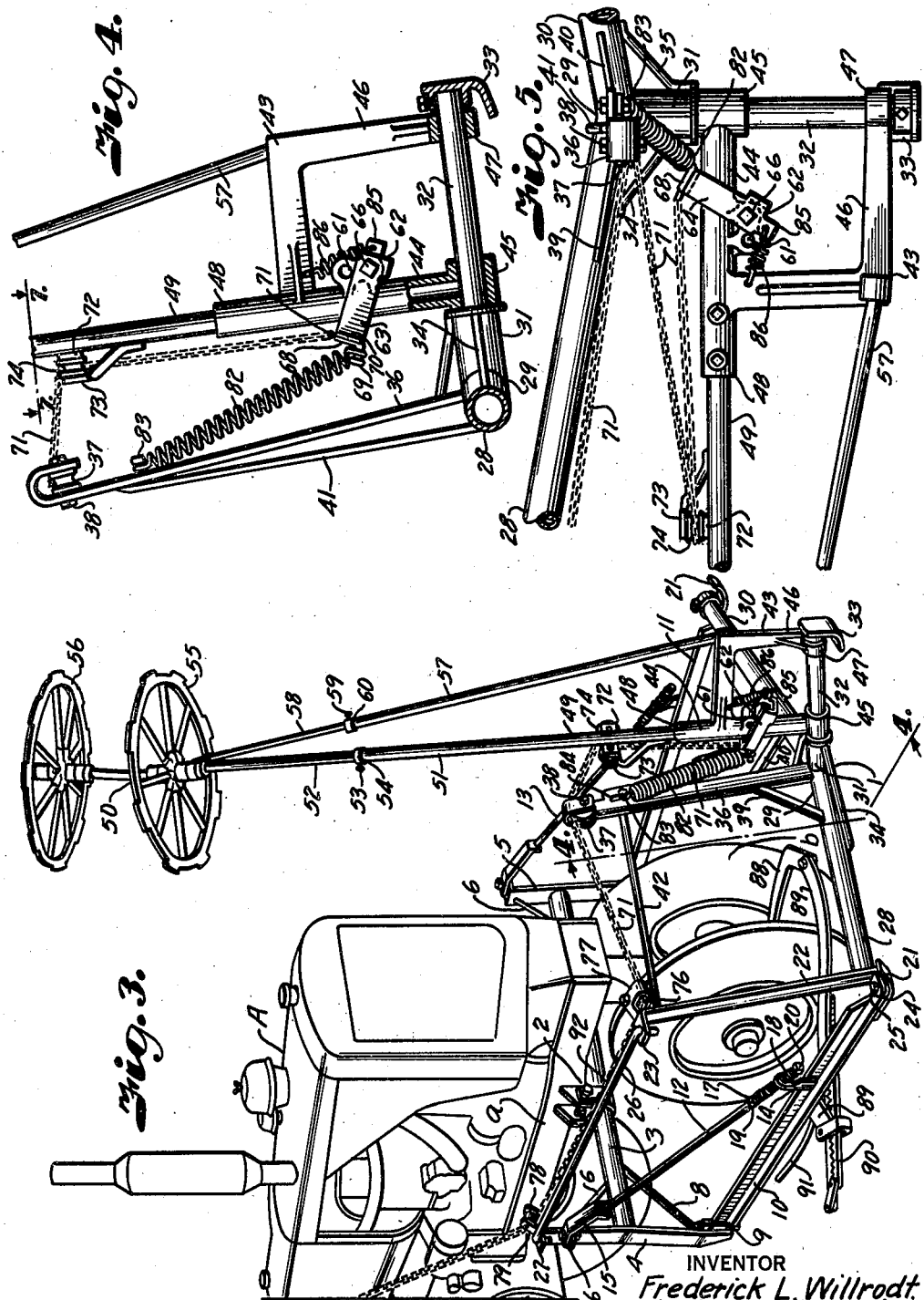
INVENTOR
Frederick L. Willrodt
BY
Arthur C. Brown, Jr.
ATTORNEY Patented Jan. 12, 1943

2,307,732

UNITED STATES PATENT OFFICE 2,307,732

TRACTOR GUIDE

Frederick L. Willrodt, Omaha, Nebr.

Application September 15, 1941, Serial No. 410,799

13 Claims. (Cl. 97—49)

This invention relates to a guide for steering a tractor when bedding, listing, plowing, or performing similar field operations with a tractor, and has for its principal objects to provide a guide of this character whereby directional movement of the tractor is kept parallel with the guide elements operating in an adjacent furrow; and to provide means for facilitating lift of the guiding elements upon reaching the end of the field.

Other objects of the invention are to provide an efficient support of the guiding elements from the tractor; to provide the guiding apparatus with a lifting spring cooperating with the lift actuating means; to provide for lengthening the effective leverage exerted by the spring when lifting the guide elements and to shorten the spring leverage to a minimum when the guide elements are in engagement with a furrow so that the full weight of the guide elements and supporting arm therefor is effective to retain their position in the furrow; and to provide a simple leverage connection between the lift operating mechanism and the guide element supporting arm whereby the guide elements may be swung to either side of the tractor and the leverages are automatically controlled when lifting the guide elements from either side.

In accomplishing these and other objects of the invention, as hereinafter pointed out, I have provided improved details of structure, the preferred form of which is illustrated in the accompanying drawings, wherein:

Fig. 1 is a perspective view of a tractor equipped with a steering guide attachment constructed in accordance with the present invention, the guide elements being shown in lowered position on the left-hand side of the tractor.

Fig. 2 is a fragmentary perspective view of a portion of the guide attachment showing the guide element supporting arm being lifted from the position shown in Fig. 1.

Fig. 3 is a perspective view, similar to Fig. 1 but showing the guide elements in elevated position and ready to be swung to the opposite side of the tractor.

Fig. 4 is a fragmentary section through a portion of the steering guide attachment on the line 4—4 of Fig. 3.

Fig. 5 is a plan view of the portion of the apparatus illustrated in Fig. 2, but showing the guide element supporting arm swung to the opposite position.

Fig. 6 is a detail perspective view of the leverage shifting yoke.

Fig. 7 is a detail section through the guide element supporting arm on the line 7—7 of Fig. 4, particularly illustrating the guide wheels for the lifting cable.

Referring more in detail to the drawings:

1 designates a tractor guiding apparatus constructed in accordance with the present invention and adapted for attachment to a tractor A. The attachment includes a supporting bracket 2, comprising a bar 3 that may be of tubular form and adapted to extend transversely below the frame $a$ of the tractor A so that the ends project from the sides thereof for mounting the guide, as later described.

Fixed to the ends of the bar 3 are vertical members 4 and 5 having upper ends braced from the bar 3 by angularly positioned rods 6. The lower ends of the members 4 and 5 are similarly braced from the bar 3 by rods 8 and carry hinging knuckles 9 to which are pivotally connected the rear ends of side arms 10 and 11. The side arms extend forwardly of the tractor beyond the front wheels $b$ thereof and are yieldingly supported in substantially horizontal position by rods 12 and 13 having their lower ends extending through brackets 14 fixed to the side arms near the front end thereof, and their rear upper ends are connected by straps 15 pivotally and adjustably connected with the laterally extending ears 16 on the upper ends of the members 4 and 5. Sleeved on the lower ends of the rods, and engaging the respective sides of the bracket 14, are coiled buffer springs 17 and 18, suitably tensioned by nuts 19 and 20 threaded onto the rods. The forward ends of the side arms carry shoe-like runners 21, and pivotally connected with one of the runners is a standard 22. The member 22 is preferably formed of strap material and has laterally extending ears 23 and 24 on the respective ends thereof, the lower ear 24 being pivotally connected with the shoe runner by a fastening device 25. Pivotally connected with the upper ear 23 is a rod 26, having its rear end pivotally connected with an ear 27 on an upper extension of the member 4.

Fixed to the lower end of the standard 22, at a point above the shoe 21, is an arm 28 of a slightly V shaped cross-member 29, the other arm 30 of which is pivotally connected with the shoe runner of the other side arm 11. The pivotal connections between the shoe runners are substantially equal to the spacing between the hinge knuckles 9 at the rear ends of the side bars so that the cross member 29 will swing in lateral directions relatively to the tractor, but will at all times maintain its parallel relationship with the cross-bar 3.

Connected with the juncture of the arms 28 and 30 is the rear end 31 of a shaft-like supporting arm 32 on the forward end of which is mounted a runner 33. The shaft 32 is suitably braced from the arms 29 and 30 by rods 34 and 35 as best shown in Fig. 5. Also fixed to the juncture point of the arms is a standard 36, having its upper end bent retractively and spaced from the body portion to accommodate a grooved pulley 37, the pulley 37 being rotatably mounted on a bolt or pin 38. The lower end of the standard 36 is braced at the sides from the arms 28 and 30 by angularly arranged braces 39 and 40, and at the rear by a brace 41. The upper end of the standard 36 is connected with the standard 22 by a tie rod 42, as best shown in Fig. 1.

Pivotally mounted on the arm 32 is a substantially yoke-shaped frame 43, having a tubular arm 44 carrying a sleeve-like head 45 oscillatable on the arm 32. The yoke also includes an arm 46, having a similar sleeve-shaped head 47 mounted on the forward end of the arm adjacent the shoe 33. The tubular arm 44 has a projecting socket portion 48, in which is fixed the main arm 49 for supporting the guide elements 50, later described. The arm 49 preferably comprises telescoping tubular sections 51 and 52, the section 51 being fixed in the tubular socket 48 and the section 52 being slidably mounted in the section 51 and adapted to be connected adjustably therewith by means of a set-screw 53 threaded in a collar 54 attached to the terminal end of the section 51.

Journalled on an axle at the outer end of the arm 49 are the guide elements 50, comprising disk-like wheels 55 and 56 arranged to rotate in a furrow with the outer sides thereof in contact with the opposite sides of the furrow, as shown in Fig. 1. The main arm 49 is braced from the other arm 46 of the yoke 43 by telescoping tubular sections 57 and 58 which are adapted to be adjusted along with the other sections by means of a set-screw 59 threaded in a collar 60 on the section 57 and adapted to engage the section 58. The guide wheel supporting arms are thus adapted to be swung on the shaft-like arm 32 from one side thereof to the other so that the guide wheels may be positioned in a furrow at either side of the tractor.

In order to move the guide wheels selectively to the desired position, the steering guide includes a lifting mechanism now to be described. Pivotally mounted in one of the apertures in a boss 61 formed on the tubular arm 44 of the yoke at a point spaced from the sleeve 45 thereof is a clevis-like lever 62, having spaced arms 63 and 64 provided with openings 65 to pass the pivot pin 66 by which the yoke is attached to the boss 61, as best shown in Fig. 2. The lever 62 also includes a connecting bar portion 67 to which is connected a bracket 68 having a headed terminal 69 extending therefrom, as best shown in Fig. 6. Fixed to the bar portion 67 of the yoke, at one side of the bracket 68, is a strap 70 spaced from the connecting portion 67 of the yoke to accommodate the link of a chain or cable 71 therebetween.

Fixed transversely of the arm section 49, in spaced relation with the pivotal axis thereof, is a strap 72 cooperating with a similar strap 73 to mount a pair of laterally spaced guide pulleys 74 and 75 to pass the chain 71 therebetween. The chain 71 also passes over the pulley 37 and over a pulley 76 that is carried by a bracket 77, with the axis thereof substantially parallel with an extended axis of the pivot member 23. After passing over the pulley 76, the chain runs substantially parallel with the connecting rod 26 and operates under a roller 78 carried by a bracket 79 fixed to the upper extension of the member 4. The free end of the chain is then wound on a drum 80 that is operated by a crank 81 located near the operator's position on the tractor.

In order to facilitate raising of the guide elements including the supporting arm therefor, I provide a coil spring 82, having one end connected with the terminal 69 of the bracket 68 and its other end fixed to a pin 83 that is adjustable in a slot 84 formed in the upper end of the standard. Connected with a tail 85 on the lever 62 and with the cross-arm of the yoke-like frame is a lever shifting spring 86. The spring 86 thus acts on the lever 62 in one direction and the chain in the opposite direction. For example, when pull is released on the chain, the spring 86 shifts the lever 62 on its pivot toward the sleeve 45 in which position the effective leverage of the spring 82 upon the guide element supporting arm is relatively short. Consequently the spring 82 has little lifting action on the guide wheels and the weight thereof retains them in the furrow. However, when pull is applied to the chain, as when lifting the guide wheels from the position shown in Fig. 1, the pull on the chain shifts the clevis-shaped lever 62 in the opposite direction so that the connecting point of the spring 82, relatively to the guide wheel carrying arm, is shifted away from the sleeve 45, thereby lengthening the effective leverage exerted by the spring so that the spring 82 aids in lifting the guide wheels to the vertical position shown in Fig. 3. Owing to the fact that the spring 82 may swing freely on the pin 83 which secures its upper end, the entire assembly carrying the guide wheels may be swung to the opposite side and the spring functions in the same manner as previously described.

The guide apparatus also includes a steering arm 88 adapted for attachment to the front axle of a tractor and which is pivotally connected by a drag link 89 with one of the side arms, for example the side arm 10. In the illustrated instance, the drag link 89 preferably includes a latch adjustment 90 operable by a cable 91 from the driver's position on the tractor so that the effective length of the lever may be varied to change the relative position of the guide wheels with respect to the tractor wheels, thereby making the tractor hold closer to or farther from the furrow so as to take care of hill slippage or contour rows. This feature, however, forms no part of the present invention.

In applying the guiding apparatus thus described, the bar 3 is secured to the under side of the tractor frame $a$ by U-shaped clamps 92 so that the bar is retained in rigid position with the side arms 10 and 11 extending forwardly alongside the front or guide wheels of the tractor with the cross-member 29 located in sufficient advance thereof to accommodate the steering arm 88 and link connection 89. The winding drum 80 is mounted in convenient reach of the driver of the tractor and the chain 71 connected therewith to be wound thereon.

When the tractor is being moved from one field to the other, the guide elements 50 are supported in perpendicular position, as shown in Fig. 3, by winding the chain on the drum by rotation of the crank 81 in the proper direction. In this position, the free end of the leverage control lever 62 is swung upwardly, as shown in Fig. 3, with the spring slightly released. When it is desired to drop the guide wheels into a furrow, for example at the left side of the tractor, a slight rocking movement is imparted to the crank of the winding drum so as to swing the guide wheels to the left side of the tractor. Upon unwinding of the cable from the winding drum, the guide wheels move toward the furrow and effect loading of the spring 82 which resists downward movement of the guide wheels. When the guide wheels are in the furrow, the forward end of the side arms 10 and 11 will shift therewith to change the position of the steering arm of the tractor so that the front wheels follow in parallel relation with the furrow. When the end of the field is reached and it is desired to lift the guide wheels from the furrow, the crank of the winding drum will be rotated to wind up the chain. The first action causes the control lever 62 to swing away from the sleeve 45 to the position shown in Fig. 4, whereupon the leverage exerted by the spring 82 is about sufficient to lift the guide wheels so that little effort need be exerted on the part of the operator by way of the crank 81. After turning the tractor, the guide wheels are caused to move to the opposite side in the same manner as above described. During initial movement, the spring is effective on the longer leverage to control downward movement of the guide wheels, but as the guide wheels contact the furrow and the weight thereof is relieved from the cable, the spring 86 is effective in shifting the lever so that the connecting point of the spring 82 is adjacent the sleeve 45 and the lifting effect of the spring 82 is substantially relieved therefrom so that the weight of the guide wheels retains them in the furrow. When it is desired to lift the wheels again, the operation is reversed by winding up the cable. However, the first movement is to effect shifting of the control lever 62 so that the spring 82 is effective on a longer leverage to assist the winding drum in lifting the guide wheels to an upright position, shown in Fig. 3.

From the foregoing it is obvious that I have provided a simple tractor guide equipped with means for controlling the leverage of the lifting spring for the guide elements so that when the guide elements are in position in the furrow the spring has little or no effect thereon and the entire weight of the guide wheels and carrying arm is effective in retaining the wheels in the furrow. However, when it is desired to lift the guide wheels, the leverage of the lifting spring is automatically lengthened so that the spring comes into play to assist in lifting the wheels from the furrow.

What I claim and desire to secure by Letters Patent is:

1. A tractor guide including, a guide element supporting arm, means pivotally supporting said arm for movement from a side of a tractor toward a vertical position, a guide element carried by said arm, raising and lowering means for moving said arm on said support, means for partially balancing said guide element including said arm when moving to and from said vertical position to said side position, and means having connection with the raising and lowering means for varying the effectiveness of said balancing means on said arm.

2. A tractor guide including, a guide element supporting arm, means pivotally supporting said arm on a tractor for movement from a side of the tractor toward a vertical position, a guide element carried by said arm, raising and lowering means for swinging said arm on the supporting means, a spring having connection with said arm for partially balancing said guide element including said arm in selected positions thereof, and means having connection with the raising and lowering means for shifting said spring connection relatively to the pivotal supporting means for said arm.

3. A tractor guide including, a guide element supporting arm, means pivotally supporting said arm on a tractor for movement from a side of the tractor toward a vertical position, a guide element carried by said arm, raising and lowering means for swinging said arm on the supporting means, a spring having connection with said arm for partially balancing said guide element including said arm in selected positions thereof, means having connection with the raising and lowering means for shifting said spring connection away from the pivotal supporting means when the raising and lowering means is under load of said arm, and a supplementary spring for effecting shift of said connection toward said pivotal supporting means when the guide element is engaged with the ground.

4. A tractor guide including, a guide element supporting arm, a guide element on said arm, means supporting said arm from a tractor to swing from one side of the tractor toward a perpendicular position, means for moving said arm, a control lever pivotally connected with said arm and having a free end arranged to swing toward and away from the pivotal support for said arm, a spring connected with the free end of said lever to partially balance said guide element supporting arm during movement thereof, and means for moving said arm and having connection with said lever for increasing the effectiveness of said spring.

5. A tractor guide including, a guide element supporting arm, a guide element on said arm, means pivotally carrying said arm from a tractor to swing laterally from one side of the tractor toward a perpendicular position, a control lever pivotally supported by the arm, a spring having one end fixed above the pivotal axis of said arm and its other end fixed to the supporting arm, a cable guide fixed to the supporting arm, a cable connected with the control lever and extended through said guide, a guide pulley for said cable carried above the pivotal support for the arm, and means for exerting a pull on said cable to raise the arm and shift said control lever to increase the effective leverage of said spring on said arm.

6. A tractor guide including, a guide element supporting arm, a guide element on said arm, means pivotally carrying said arm from a tractor to swing laterally from one side of the tractor to the other through a perpendicular position, a control lever pivotally supported by the arm, a spring having one end fixed above the pivotal axis of said arm and its other end fixed to the control lever, a cable guide fixed to the supporting arm, a cable connected with the control lever and extended through said guide, a guide pulley for said cable carried above the pivotal support for the arm, and means for exerting a pull on said cable to raise the arm and shift said control lever to increase the effective leverage of said spring on said arm.

7. A tractor guide including, a guide element supporting arm, a guide element on said arm, means pivotally carrying said arm from a tractor to swing laterally from one side of the tractor to the other through a perpendicular position, a control lever pivotally supported by the arm, a spring having one end fixed above the pivotal axis of said arm and its other end fixed to the control lever, a cable guide fixed to the supporting arm, a cable connected with the control lever and extended through said guide, a guide pulley for said cable carried above the pivotal support for the arm, means on the tractor for exerting a pull on said cable to raise the arm and shift said control lever to increase the effective leverage of said spring on said arm, and means for shifting the control lever in the opposite direction to reduce the effective leverage of said spring.

8. A tractor guide including, a guide element supporting arm, a guide element on said arm, means pivotally carrying said arm from a tractor to swing laterally from one side of the tractor to the other through a perpendicular position, a control lever pivotally supported by the arm, a spring having one end fixed above the pivotal axis of said arm and its other end fixed to the control lever, a cable guide fixed to the supporting arm, a cable connected with the control lever and extended through said guide, a guide pulley for said cable carried above the pivotal support for the arm, means on the tractor for exerting a pull on said cable to raise the arm and shift said control lever to increase the effective leverage of said spring on said arm, and a spring connected with the control lever to shift the control lever in the opposite direction for reducing the effective leverage of said spring when the guide element is in ground engaging position.

9. A tractor guide including, a guide element supporting arm, guide elements on said arm, means supporting said arm from a tractor to swing from one side of the tractor to the other through a perpendicular position, means for moving said arm to and from said perpendicular position, a control lever pivotally connected with said arm and having a free end arranged to swing toward and away from the pivotal support for said arm, a spring connected with the free end of said lever to partially balance said guide element supporting arm to and from said perpendicular position, and means connected with said lever for shifting the spring relatively to the pivotal support for said arm.

10. A tractor guide including, a guide element supporting arm, a guide element on said arm, means supporting said arm from a tractor to swing from one side of the tractor to the other through a perpendicular position, means for moving said arm to and from said perpendicular position, a control lever pivotally connected with said arm and having a free end arranged to swing toward and away from the pivotal support for said arm, a spring connected with the free end of said lever to partially balance said guide element supporting arm to and from said perpendicular position, means connected with said lever for shifting the spring away from the pivotal support of the guide element supporting arm when the guide element supporting arm is being raised or lowered toward and away from said perpendicular position, and means for shifting the control lever toward said pivotal support for reducing the effect of said spring when the guide element is engaging a furrow.

11. A tractor guide including, arms adapted for pivotal support on the respective sides of a tractor, a cross-member connecting said arms, a shaft-like support projecting forwardly from the cross-member, a guide element supporting arm pivoted on said shaft-like support, a guide element carried by said arm, means for swinging said arm from one side of the tractor to the other through a perpendicular position, means for partially balancing said guide element including said arm when moving to and from said perpendicular position, and means having connection with the swinging means for varying the effectiveness of said balancing means.

12. A tractor guide including, arms adapted for pivotal support on the respective sides of a tractor, a cross-member connecting said arms, a shaft-like support projecting forwardly from the cross-member, a guide element supporting arm pivotally mounted on said shaft-like support, a guide element on said arm, a control lever pivotally supported by the guide carrying arm, a standard carried by said cross-member, a spring having one end fixed to said standard and its other end fixed to the control lever, a cable guide fixed to the supporting arm, a cable connected with the control lever and extended through said guide, a guide pulley for said cable mounted on said standard, and means for exerting a pull on said cable to raise the arm and to shift said control lever to increase the effective leverage of said spring.

13. A tractor guide including, a bracket for attachment to a tractor having vertical end members, side arms pivoted to said end members of the bracket, a cross-member connecting the forward ends of said arms, a guide element supporting arm, a guide element on said arm, means pivotally carrying said arm from the cross-member to swing from one side of the tractor to the other through a perpendicular position, means pivotally suspending the forward ends of the side arms from the end members of the bracket, a standard pivotally carried at the forward end of one side arm, a link connecting the standard with the bracket, a control lever pivotally supported by the arm, a standard carried by the cross-member, a spring having one end fixed to the last named standard and its other end fixed to the control lever, a cable guide fixed to the guide element supporting arm, a cable connected with the control lever and extended through said guide, guide pulleys for said cable carried on said standards, and means for exerting a pull on said cable to raise the guide element supporting arm and shift said control lever to increase the effective leverage of said spring on said arm in selected positions thereof.

FREDERICK L. WILLRODT.